No. 687,457. Patented Nov. 26, 1901.
L. HARGREAVES & W. STUBBS.
ELECTRODE.
(Application filed July 5, 1900.)
(No Model.)
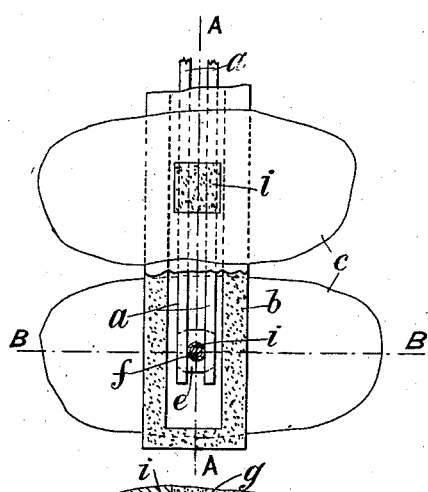
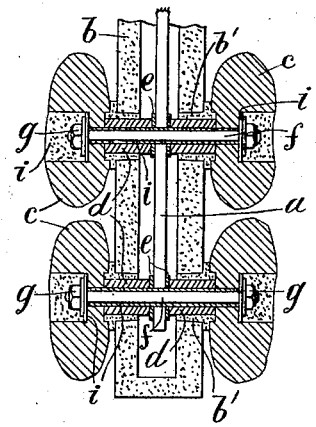
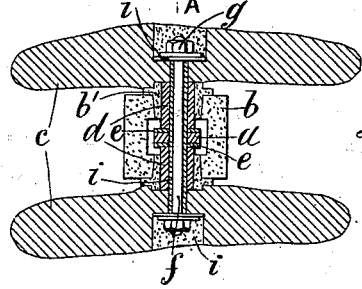
Witnesses
W B Johnson
Wm Cary
Inventors
Luke Hargreaves
William Stubbs

UNITED STATES PATENT OFFICE.

LUKE HARGREAVES AND WILLIAM STUBBS, OF FARNWORTH-IN-WIDNES, ENGLAND.

ELECTRODE.

SPECIFICATION forming part of Letters Patent No. 687,457, dated November 26, 1901.

Original application filed June 17, 1899, Serial No. 720,891. Divided and this application filed July 5, 1900. Serial No. 22,524. (No model.)

*To all whom it may concern:*

Be it known that we, LUKE HARGREAVES and WILLIAM STUBBS, subjects of the Queen of Great Britain, residing at Farnworth-in-Widnes, in the county of Lancaster, England, have invented new and useful Improvements in Electrodes, of which the following is a specification.

The objects of the invention are to provide means whereby pieces of carbon or equivalent substance which form the part of the electrode in electrical contact with the electrolyte, may be securely attached to a metallic or other electric conductor incased in insulating material, the connection being so made as to allow of easy removal of the carbons when worn and substitution of new carbons, and whereby the means for securing the carbons may be protected against the corrosive action of the electrolyte. We attain these objects by arrangements such as are illustrated in the accompanying drawings, in which—

Figure 1 is a side view, partly in section, of a portion of an electrode particularly suitable for use as an anode. Fig. 2 is a vertical section at the line A A on Fig. 1, and Fig. 3 is a horizontal section at the line B B on Fig. 1.

For the purposes of our invention we make contact between an electric conductor, whether metallic or otherwise, and the pieces of carbon which form the working or wearing anodes in contact with the electrolyte by means of blocks or nipples of carbon or other good conducting material not affected by the electrolyte. The said nipples pass through an insulating-casing surrounding the conductor and are pressed against the conductor by bolts and nuts or equivalent devices. The working anodes are secured to the said nipples by bolts or the like.

Referring to the drawings, $a$ is an electric conductor, in this case metallic and formed in two pieces and connected in any suitable way to one terminal of a dynamo or other source of electricity.

$b$ is a casing surrounding the conductor and made of Portland cement, vulcanite, or other non-conducting material to protect the conductor from the electrolyte.

$c$ represents the working anodes, of carbon or other suitable material, which come in contact with the electrolyte.

$d$ represents blocks or nipples, of carbon or other good conducting material. The nipples $d$ pass through the casing $b$ and rest at one end against the anodes $c$ and at the other end against washers $e$, attached to the conductor $a$, or the nipples may rest against the conductor itself. The washers $e$ are preferably of soft metal, so that the nipples $d$ may closely bed therein.

$f$ represents bolts passing through the nipples $d$ and through or partly through the anodes $c$ and provided with nuts $g$ at each end, by means of which the anodes $c$ are pressed closely against the nipples $d$ and the nipples $d$ against the washers $e$ or conductor $a$, so that good electrical connection is made from the conductor to the anodes $c$.

The cement casing $b$ may be cast in contact with the nipples $d$ or openings may be left, which are afterward filled in with cement $b'$.

The bolts $f$ and nuts $g$ may be made of non-conducting material, such as vulcanite, not affected by the electrolyte, or preferably they may be made of metal and, as shown, be covered or surrounded with insulating material $i$ to protect them from the action of the electrolyte and prevent their acting as bearers of electric current, which would tend to corrode them.

If desired, separate bolts might be used for attaching the nipples $d$ to the conductor $a$ and for pressing the anodes $c$ against the nipples $d$.

We do not confine ourselves to the particular details shown, as it will be obvious that various arrangements may be made to effect the same purpose without departing from our invention; but

What we claim as our invention, and desire to secure by Letters Patent, is—

1. The combination with an electric conductor and detachable anodes, of nipples of conducting material disposed between the conductor and the detachable anodes, and bolts for connecting the detachable anodes to the nipples and the nipples to the conductor; substantially as described.

2. The combination with an electric conductor and detachable anodes, of a non-conducting casing surrounding the conductor, nipples of carbon passing through the casing and resting against the conductor, and bolts for connecting the detachable anodes to the nipples, and the nipples to the conductor; substantially as described.

3. In an electrode, the combination of a conductor, a non-conducting casing surrounding the conductor, nipples of conducting material passing through the casing, detachable anodes resting against the nipples, bolts for connecting the detachable anodes to the nipples and the nipples to the conductor, and insulating material surrounding the bolts; substantially as described.

4. In an electrode the combination of a conductor, a non-conducting casing surrounding the conductor, nipples of conducting material passing through the casing, detachable anodes resting against the nipples, and means for pressing the detachable anodes in contact with the nipples and the nipples in contact with the conductor; substantially as described.

5. The combination with an electric conductor and detachable anodes, of nipples of carbon arranged between the conductor and the detachable anodes, and bolts for connecting the anodes to the nipples, and the nipples to the conductor; substantially as described.

In witness whereof we have signed our names to this specification in the presence of two subscribing witnesses.

LUKE HARGREAVES.
WILLIAM STUBBS.

Witnesses:
W. B. JOHNSON,
WM. OWEN.